United States Patent Office 3,687,621
Patented Aug. 29, 1972

3,687,621
PROCESS FOR THE PRODUCTION OF CYANOGEN
Friedhelm Geiger, Offenbach, Theodor Lussling and Ferdinand Theissen, Grossauheim, and Wolfgang Weigert, Offenbach, Germany, assignors to Deutsche Gold- und Silber-Scheideanstalt vormals Roessler, Frankfurt am Main, Germany
No Drawing. Filed May 15, 1970, Ser. No. 37,864
Claims priority, application Germany, May 31, 1969,
P 19 27 847.8
Int. Cl. C01c 3/00
U.S. Cl. 423—384     11 Claims

ABSTRACT OF THE DISCLOSURE

Cyanogen is prepared by reacting hydrogen cyanide and chlorine in the presence of a surface active catalyst. The product still containing hydrogen cyanide is treated with 1 to 1.1 mole of chlorine per mole of hydrogen cyanide remaining at 195 to 800° C. for 10 to 0.01 second and in the presence of the surface active catalyst, preferably activated carbon.

---

The invention is directed to a process for the production of cyanogen by reacting hydrogen cyanide and chlorine in the presence of a surface active catalyst.

In U.S. Pat. 2,399,361 there is described a process in which 2 molecules of hydrogen cyanide are converted to cyanogen by the use of 1 molecule of chlorine gas as a hydrogen accepter by passing through a bed of a surface active catalyst, for example, activated carbon. It is stated in that patent that a practically complete transforation of the hydrogen cyanide to cyanogen results. However, this assertion is contrary to thermodynamic calculations which show that a quantitative formation of cyanogen can no longer occur at temperatures above 300° C. (573° K.). Concerning this statement in the U.S. patent, it can only be assumed that it was not possible to make an exact analysis with the analytical methods known at that time. For the first time, the use of modern analytical procedures show that, in agreement with the thermodynamic calculations, the reaction of hydrogen cyanide with chlorine independent of whether an excess or deficiency of hydrogen cyanide is employed always results in unreacted hydrogen cyanide and cyanogen chloride in the reaction mixture.

It is understandingly possible to obtain a reaction mixture which is free of hydrogen cyanide if chlorine is used in high excess and the reaction components, hydrogen cyanide and chlorine, are reacted in about the molar ratio of 1:1. There is obtained, however, as a principle component cyanogen chloride, so that the production of cyanogen in this way is not practicable. On the other hand, it was also conceivable to carry out the reaction at such low temperatures that the equilibrium lies entirely on the side of the formation of cyanogen. However, for this such high residence times are necessary that on this basis an industrial process cannot be carried out. The presence of the unreacted hydrogen cyanide in the reaction gases of the reaction of hydrogen cyanide with chlorine makes considerably more difficult the working up of the cyanogen for purification since the hydrogen cyanide itself is found distributed in all fractions in an extractive separation.

It has now been found that in contrast to known processes it is possible to obtain a complete reaction between hydrogen cyanide and chlorine and produce a hydrogen cyanide free reaction mixture which only contains cyanogen, cyanogen chloride and hydrogen chloride if the gas mixture resulting from the reaction and still containing hydrogen cyanide is treated with a surface active catalyst at a temperature between 195 and 800° C. for 10 to 0.01 second with chlorine in an amount of 1.0 to 1.1 mole of chlorine per mole of hydrogen cyanide. This subsequent reaction is especially favorably carried out at temperatures between 400 and 600° C., while holding the residence time between 2.00 and 0.03 second.

Within the given boundaries, the temperatures and residence times are so regulated that high temperatures are used with short residence times and vice versa, i.e., the residence time is inverse to the temperature employed. As the surface active catalyst activated carbon is especially preferred. Other surface active catalysts are silica gel and activated alumina.

For the success of the process of the invention not only is the choice of the right working temperature in the subsequent reaction of decisive importance, but also in the primary reaction, since on the one hand the speed of the desired reaction and on the other hand the undesired reverse reaction and decomposition of cyanogen depend on it. Besides, it must also be borne in mind in the choice of working temperature that the reaction mixture attacks the walls of metallic reactors to an increasing extent at higher temperatures and so places relatively narrow boundaries on the wall temperatures. Nickel, for example, is suited as a wall material. In a nickel reactor, however, the wall temperature is not permitted to exceed 540° C. since otherwise there occurs a chlorination of the reactor material. Also the temperature must be accordingly regulated that the catalytic action of the reactor material on the decomposition of the cyanogen formed remains within narrow boundaries or is avoided entirely.

Since the reaction of hydrogen cyanide with chlorine is strongly exothermic, the temperature behavior of the entire process is of considerable importance. Therefore it is preferable to so operate according to the invention that the reaction of the hydrogen cyanide with chlorine takes place in two separate steps, i.e., in two reactors arranged one after the other. According to this preferred mode of operation in the reactor used for the first step, a molar ratio of hydrogen cyanide to chlorine is maintained at less than 1:1, usually between 0.3:1 and 0.8:1 and the second step carried out in an adiabatically operating reactor. The remaining amount of hydrogen cyanide required for the reaction of 2 moles of hydrocyanic acid with 1 mole of chlorine is introduced into the reaction mixture between the first and second steps. The procedure can be so carried out with regard to the necessary chlorine that it is either fed in its entire amount to the first reactor or the part necessary in the second reactor directly added to such reactor.

The temperature inside the reactor of the first step can mount up to 1000° C. if it is assured that the reactor walls do not exceed the permitted temperature. The amount of the fall in temperature inside the catalyst bed (surface active catalyst) to the wall is dependent on the one hand by the proportions of the reactants and on the other hand by the diameter of the reactor. For example, there is produced in a nickel reactor from which the heat is removed only by normal radiation and heat conduction at an inner diameter of 25 mm. and a catalyst charge of about 17 kg. chlorine and 7 kg. of hydrogen cyanide per liter of catalyst, a stationary wall temperature of 240° C. and peak temperature in the catalyst bed of 500 to 550° C. In this example the activated carbon charge consists of cylinders of 3 x 6 mm. with an active surface area of 1200 m.²/g. More suitably in the first step hydrogen cyanide and chlorine are reacted in the molar ratio of 1:1 and smaller (of HCN to Cl₂), e.g., as low as 0.1:1 at residence times of more than 0.001, preferably from 0.1 to 1 second, although times up to seconds can be used.

In the preferred method of operation, the process takes place in the second adiabatically operating reactor which, for example, may consist of quartz or can have ceramic walls. The surface active catalyst is also employed to form cyanogen from cyanogen chloride and hydrogen cyanide and the reaction of so much chlorine and hydrogen cyanide that the desired reaction temperature is reached adiabatically. It should lie between 600 and 1100° C., preferably between 750 and 950° C. and the residence time here amounts to more than 0.5 second, preferably 1 to 5 seconds, although times up to 15 seconds and higher can be used.

The waste gases leaving the second reactor are then, as described above, subjected to the subsequent reaction over a surface active catalyst whereby, without loss of cyanogen, the residual hydrogen cyanide is reacted with chlorine practically quantitatively to cyanogen chloride. The gas mixture leaving the subsequent reaction consists only of cyanogen, cyanogen chloride and hydrogen chloride and, since it is free of hydrogen cyanide can now, according to the invention by an absorption be separated in simple manner into cyanogen chloride and a mixture of cyanogen and hydrogen chloride.

This method of working up depends upon the surprising realization that the cyanogen, contrary to expectations, behaves similar to the hydrogen chloride rather than the cyanogen chloride. According to the invention, the absorption wash is carried out in such a way that the gas mixture is treated with organic solvents in which cyanogen chloride has good solubility, but which are poor solvents for hydrogen chloride and cyanogen. A certain solubility for cyanogen is without disadvantage since this can be led back into the process with recycled cyanogen chloride.

As absorption agents, there can be used especially alkyl aromatic hydrocarbons, preferably alkylbenzenes with side chains of 8–12 carbon atoms, e.g. octyl benzene, nonyl benzene and dodecyl benzene, as well as mixtures thereof, additionally alkanes with boiling points between 200 and 300° C., e.g. undecane and heptadecane, in a given case admixed with naphthenes. Also especially suitable are halohydrocarbons, preferably chlorohydrocarbons, e.g. aliphatic such as carbon tetrachloride, 1,1,2-trichloroethylene, 1,1,1,2-tetrachloroethane, 1,1,2,2,-tetrachloroethane, pentachloroethane, 1,2,3-trichloropropane, 1,2-dichlorobutane, 2,3-dichlorobutane, tetrachloroethylene, and hexachlorobutadiene-1,3, bromoform, ethylene dibromide, trimethylene bromide, aromatic halohydrocarbons, preferably aromatic chlorohydrocarbons such as chlorobenzene, 1,2-dichlorobenzene, and 1,2,4-trichlorobenzene, bromobenzene, 1,2 - dibromobenzene and fluorochlorohydrocarbons such as 1-fluoro-1,2,2-trichloroethane, 1-fluoro-1,1,2,2-tetrachloroethane or poly (trifluoroethylene.)[1]

The process is carried out more suitably in continuous fashion. The following arrangement, for example, is suitable for them. Solvent is fed from above into the absorption column. The gas mixture to be separated is preferably fed into the lower third of the column. Cyanogen and hydrogen chloride escape at the head of the column. The solvent laden with cyanogen chloride and eventually with some cyanogen is drawn off from the bottom of the column. Preferably the lowest part of the column is heated in order to free the liquid running off from the entrained cyanogen and hydrogen chloride while the uppermost part of the column according to the type of solvent used to obtain a solvent-free cyanogen-hydrogen chloride mixture is cooled, if necessary.

The cyanogen chloride containing solvent drawn off from the absorption column arrives at a distillation column and preferably is fed to it at the middle. At the head of this column, the cyanogen chloride is either partially condensed and drawn off as a gas or completely condensed and drawn off as a liquid. It is preferably returned to the second reactor or isolated as such, while it is freed from the cyanogen contained therein by low temperature or low pressure distillation. The cyanogen then accumulates as the head product, the cyanogen chloride as the sump product. The pure solvent running from the sump of the column for the cyanogen chloride-solvent distillation is recycled into the absorption column.

The described absorption wash assumes that the reaction gases from the two or three step reaction of hydrogen cyanide and chlorine are absolutely free of hydrogen cyanide since, otherwise, the hydrogen cyanide, to be sure, remains for a large part in the gas phase, but also becomes dissolved by the absorption liquid so that the mixture of cyanogen and hydrogen chloride cannot be separated in pure form, i.e., without a more or less great content of hydrogen cyanide.

The gaseous mixture, which consists only of cyanogen and hydrogen chloride, leaving the cyanogen chloride absorption column can be further used as such for many purposes. In so far as pure cyanogen free of hydrogen chloride is desired, the hydrogen chloride can, for example, be separated by a water wash which is known in itself, since cyanogen is only slightly soluble in aqueous hydrochloric acid or water.

Additionally these small, still dissolved portions of cyanogen are, however, in case it is necessary, still recoverable by a stripping distillation of the aqueous hydrochloric acid.

The separation of the cyanogen from the hydrogen chloride and cyanogen chloride can also be effected in known manner with the help of a water wash and a subsequent distillation, whereby the separation of the hydrogen chloride can be carried out by means of a water wash in the presence of cyanogen chloride.

EXAMPLE 10 moles of chlorine gas, together with 7 moles of hydrocyanic acid gas were well mixed and brought to reaction every hour in reactor I filled with activated carbon. The reactor was made of pure nickel and had an inner diameter of 25 mm. and was 100 mm. long. The peak temperature in the reactor, which was only cooled by radiation and heat conduction, amounted to about 440° C. The gases leaving reactor I were mixed with a further 13 moles of hydrocyanic acid gas and reacted in reactor II to form cyanogen at a maximum temperature of 930° C. over an activated carbon catalyst in a quartz tube having an 80 mm. inner diameter and a length of 1300 mm.

The gases leaving reactor II were, after cooling, well mixed with 0.6 mole of chlorine gas and brought to reaction at 500° C. over an activated carbon catalyst in reactor III, having an 80 mm. inner diameter and a length of 100 mm. The waste gases from reactor III were introduced into the lower third of an absorption column filled with packing material.

These were fed hourly to the head of this column 13.7 kg. (8.4 liters) of tetrachlorethylene as an absorption agent at room temperature and normal pressure. The lower part of the column was heated. The liquid running out of the bottom of the column with a temperature of 50 to 60° C. contained 0.55 weight percent cyanogen chloride, 0.28 weight percent cyanogen and 0.08 weight percent hydrogen chloride. The cyanogen-hydrogen chloride mixture leaving at the head of the column was practically free of cyanogen chloride. This gas mixture was washed hourly in an absorption column filled with packing material with about 10 liters of water at normal temperature to remove the hydrogen chloride. In the lower part of the column thereby temperatures of about 40° C. were permitted which were attained by recycling a part of the wash solution in the lower half of the absorption column over a cooler. The cyanogen leaving at the head was ---
[1] Depending on the gas composition and the solvents used the absorption will be carried out under normal conditions or at slightly reduced or elevated temperatures and/or elevated pressures. The temperatures will be kept between −15° C. and 100° C., preferably between −15° C. and 60° C. and pressures between 0.5 and 10 at absolute, preferably between 1 and 5 at absolute.

separated from the water carried over in a cyclone and after drying, for example, over calcium chloride, obtained free of hydrogen chloride. The yield of cyanogen amounted to 95% of theory based on the hydrogen cyanide charged.

The liquid running out of the absorption column was fed to a distillation column whose sump was heated to the boiling point of tetrachloroethylene (B.P. 760, 121° C.). The cyanogen chloride leaving at the head contained the above stated amounts of cyanogen and hydrogen chloride and was fed into reactor II. The absorption agent leaving the sump of the column was free of cyanogen chloride and was recycled to the absorption column.

What is claimed is:

1. A process for the production of cyanogen which comprises reacting hydrogen cyanide and chlorine in two steps in the presence of a surface-active catalyst wherein the first step hydrogen cyanide and chlorine are reacted in the molar ratio of less than 1:1 at a temperature above 300° C. and a residence time of greater than 0.001 second to form cyanogen chloride and thereafter adding the necessary amount of hydrogen cyanide in a second step to form the cyanogen, said second step being carried out adiabatically at a temperature between 600 and 1100° C., and thereafter subsequently treating the cyanogen containing gas mixture resulting from the second step of the reaction and still containing residual hydrogen cyanide at a temperature between 195 and 800° C. for a residence time between 10 seconds and 0.01 second with 1.0 to 1.1 mole of chlorine per mole of hydrogen cyanide in the presence of a surface-active catalyst.

2. A process according to claim 1 wherein the catalyst is activated carbon.

3. A process according to claim 1 wherein the subsequent treatment is at 400 to 600° C. for 2.00 to 0.03 seconds.

4. A process according to claim 1 wherein the first step is carried out in a time of 0.1 to 1 second.

5. A process according to claim 1 wherein the second step is carried out at between 750 and 950° C.

6. A process according to claim 1 wherein the reaction of the hydrogen cyanide and chlorine in the first step is carried out at a temperature up to 1000° C.

7. A process according to claim 1 wherein the surface active catalyst is selected from the group consisting of silica gel, activated alumina and activated carbon.

8. A process according to claim 1 wherein the catalyst is activated carbon.

9. A process according to claim 1 wherein cyanogen chloride is formed as a byproduct and is separated after the subsequent treatment from the reaction mixture by an absorption wash with an organic solvent selected from the group consisting of hydrocarbons and halohydrocarbons.

10. A process according to claim 9 wherein the organic solvent for the cyanogen chloride is selected from the about 200° C. and chlorohydrocarbons.

11. A process according to claim 9 wherein the reaction of the hydrogen cyanide and chlorine in the first step is carried out at a temperature up to 1000° C.

References Cited

UNITED STATES PATENTS

| | | | |
|---|---|---|---|
| 2,399,361 | 4/1946 | Lacy et al. | 23—151 |
| 1,779,984 | 10/1930 | Schmittnägel | 23—359 |

FOREIGN PATENTS

| | | | |
|---|---|---|---|
| 820,580 | 8/1959 | Great Britain | 23—359 |

OSCAR R. VERTIZ, Primary Examiner

H. S. MILLER, Assistant Examiner

U.S. Cl. X.R.

23—379